United States Patent
Burke et al.

(10) Patent No.: US 12,394,202 B2
(45) Date of Patent: Aug. 19, 2025

(54) AI-BASED TRANSFORMATION OF AUDIO/VIDEO CONTENT

(71) Applicant: ReadyReport Inc., Philadelphia, PA (US)

(72) Inventors: Lucas James Burke, Philadelphia, PA (US); Robert M Orozco, Milwaukee, WI (US)

(73) Assignee: ReadyReport Inc., Philadelphia, PA (US)

( * ) Notice: Subject to any disclaimer, the term of this patent is extended or adjusted under 35 U.S.C. 154(b) by 0 days.

(21) Appl. No.: 18/940,490

(22) Filed: Nov. 7, 2024

(65) Prior Publication Data

US 2025/0148787 A1   May 8, 2025

Related U.S. Application Data (60) Provisional application No. 63/597,270, filed on Nov. 8, 2023.

(51) Int. Cl.
| | |
|---|---|
| G06V 20/00 | (2022.01) |
| G06T 7/20 | (2017.01) |
| G06V 10/44 | (2022.01) |
| G06V 20/40 | (2022.01) |

(52) U.S. Cl.
CPC ............. *G06V 20/44* (2022.01); *G06T 7/20* (2013.01); *G06V 10/44* (2022.01); *G06V 20/41* (2022.01); *G06V 2201/07* (2022.01)

(58) Field of Classification Search
None
See application file for complete search history.

(56) References Cited

U.S. PATENT DOCUMENTS

| | | |
|---|---|---|
| 7,379,879 B1 | 5/2008 | Sloo |
| 11,334,622 B1 | 5/2022 | Buckley |
| 2006/0036590 A1 | 2/2006 | Kouchri |
| 2007/0294105 A1 | 12/2007 | Pierce |
| 2012/0173281 A1 | 7/2012 | Dilella |
| 2016/0203817 A1 | 7/2016 | Formhals |
| 2017/0308800 A1* | 10/2017 | Cichon ............ G06N 20/00 |

(Continued)

*Primary Examiner* — Daniel T Tekle
(74) *Attorney, Agent, or Firm* — Forsgren Fisher McCalmont DeMarea Tysver; Daniel A. Tysver; James M. Urzedowski (57) ABSTRACT

This disclosure describes a system and method for generating structured reports from video footage using artificial intelligence. The system extracts frames from video inputs, identifies and tracks objects across frames, and applies importance adjustments based on context. A Long Short-Term Memory (LSTM) network analyzes temporal patterns and integrates spatial data from feature point identification and geomapping techniques. Event detection modules identify key actions, while scene understanding and semantic segmentation provide environmental context and pixel-level detail. Outputs from these analyses are processed by a generative AI engine, specifically a large language model (LLM), to produce a coherent natural language description of the recorded events. A second LLM formats the narrative according to the template required by the organization, such as a police department, ensuring compliance with specific standards. Users can review and edit the final report through an interface before submission.

16 Claims, 4 Drawing Sheets

(56) References Cited

U.S. PATENT DOCUMENTS

| | | |
|---|---|---|
| 2019/0012591 A1* | 1/2019 | Limsopatham ........ G06N 3/042 |
| 2019/0147105 A1* | 5/2019 | Chu ................. G06F 18/24143 |
| | | 386/241 |
| 2019/0287012 A1* | 9/2019 | Celikyilmaz ......... G06F 16/345 |
| 2020/0175861 A1 | 6/2020 | Wansa |
| 2020/0258181 A1 | 8/2020 | Song |
| 2020/0321030 A1* | 10/2020 | Kellicker ......... H04N 21/44008 |
| 2022/0027633 A1* | 1/2022 | Jo ......................... G06N 3/044 |
| 2022/0141503 A1* | 5/2022 | Cui ..................... G06V 10/761 |
| | | 725/19 |
| 2022/0245109 A1* | 8/2022 | Hatami-Hanza ......... G06N 7/01 |
| 2022/0262406 A1* | 8/2022 | Daugherty ........... G11B 27/031 |
| 2022/0383120 A1* | 12/2022 | Bahri .................... G06F 18/217 |
| 2023/0089199 A1* | 3/2023 | Panchaksharaiah ........................ |
| | | H04N 21/454 |
| | | 725/25 |
| 2023/0386208 A1* | 11/2023 | Jin ...................... G06F 16/7844 |
| 2024/0037948 A1* | 2/2024 | Chen ..................... G06V 20/46 |
| 2024/0062518 A1* | 2/2024 | Li ........................ G06V 10/765 |

\* cited by examiner

AI-BASED TRANSFORMATION OF AUDIO/VIDEO CONTENT

CROSS-REFERENCE TO RELATED CASES

This application claims the benefit of U.S. Provisional Application No. 63/597,270, filed on Nov. 8, 2023, which is hereby incorporated by reference.

TECHNICAL FIELD

The application relates to the processing of audio and video content utilizing a variety of trained neural network components into a defined format.

SUMMARY

This disclosure describes a system and method for generating automated, comprehensive reports from video footage using advanced artificial intelligence techniques. The system is designed to transform video content, such as body-worn camera footage, into structured, natural language reports that meet the specific formatting requirements of the organization using the system. The method ensures that the video analysis is thorough, leveraging object detection, event detection, scene understanding, and semantic segmentation to extract and interpret critical details from the footage. The outputs from these processes are then synthesized into a coherent narrative by a generative AI engine, specifically a large language model (LLM), which produces a detailed written description suitable for incident reports, summaries, or other official documentation.

The process begins with frame extraction and pre-processing, where individual frames are extracted from the video and enhanced to improve the accuracy of downstream analyses. The system applies normalization, noise reduction, and frame stabilization techniques to ensure consistent inputs for further processing. Object detection is then performed to identify key objects within each frame, such as individuals, vehicles, or items like weapons, using AI models such as YOLO or SSD. Following object detection, the system applies object tracking using algorithms such as SORT or DEEP SORT to maintain object continuity across frames, assigning persistent IDs and tracking objects even as they move through the scene or are temporarily obscured.

The system then conducts object importance adjustment by aggregating metadata on object appearances and behaviors. A specially trained neural network dynamically adjusts the importance of objects based on their relevance to the context. For example, a weapon briefly visible in the video receives high importance, while a trivial object like a coffee cup might initially be ignored unless its behavior changes significantly.

The processed data feeds into a Long Short-Term Memory (LSTM) network, which analyzes the temporal progression of events and interactions. The LSTM component integrates inputs from the object tracking and importance adjustment stages and uses additional inputs, such as feature point identification, geomapping, and Gaussian splatting, to enhance object persistence and spatial understanding. This enables the LSTM to track subtle changes, such as a suspect initially following commands but later engaging in suspicious behavior, while also mapping actions within a three-dimensional space. Following the temporal analysis by the LSTM, the system applies trained event detection to identify key actions within the video, such as issuing commands, physical confrontations, or vehicle interactions. Scene understanding further contextualizes the events, interpreting the broader environment, such as recognizing whether the interaction occurs on a street, in a park, or within a building. Semantic segmentation provides pixel-level spatial detail, ensuring that each object and environmental feature is correctly classified, such as distinguishing a sidewalk from a road or identifying a crosswalk within the scene.

The outputs from the LSTM, event detection, scene understanding and semantic segmentation components are then fed into a large language model (LLM). This LLM generates a coherent, natural language description of the events and interactions within the video, capturing both the temporal progression and spatial relationships. The generated narrative is logically structured, providing a clear account of what occurred during the recorded events. The narrative can be further processed by another LLM designed to format the description according to the specific template required by the organization using the system, such as a police department or regulatory agency. This formatting step ensures that the final report adheres to the organization's preferred structure, tone, and content guidelines, producing a professional and compliant report ready for official use.

The system also provides users with an interface to review and edit the generated report before submission. Once finalized, the report is submitted to the organization's database, and the system performs an assessment of the AI components to evaluate their effectiveness and alignment with organizational requirements. This assessment also includes behavioral analysis, identifying whether actions captured in the video align with expected protocols and whether there are teachable moments to inform future training.

DETAILED DESCRIPTION

Overall System 100

Figure 1:
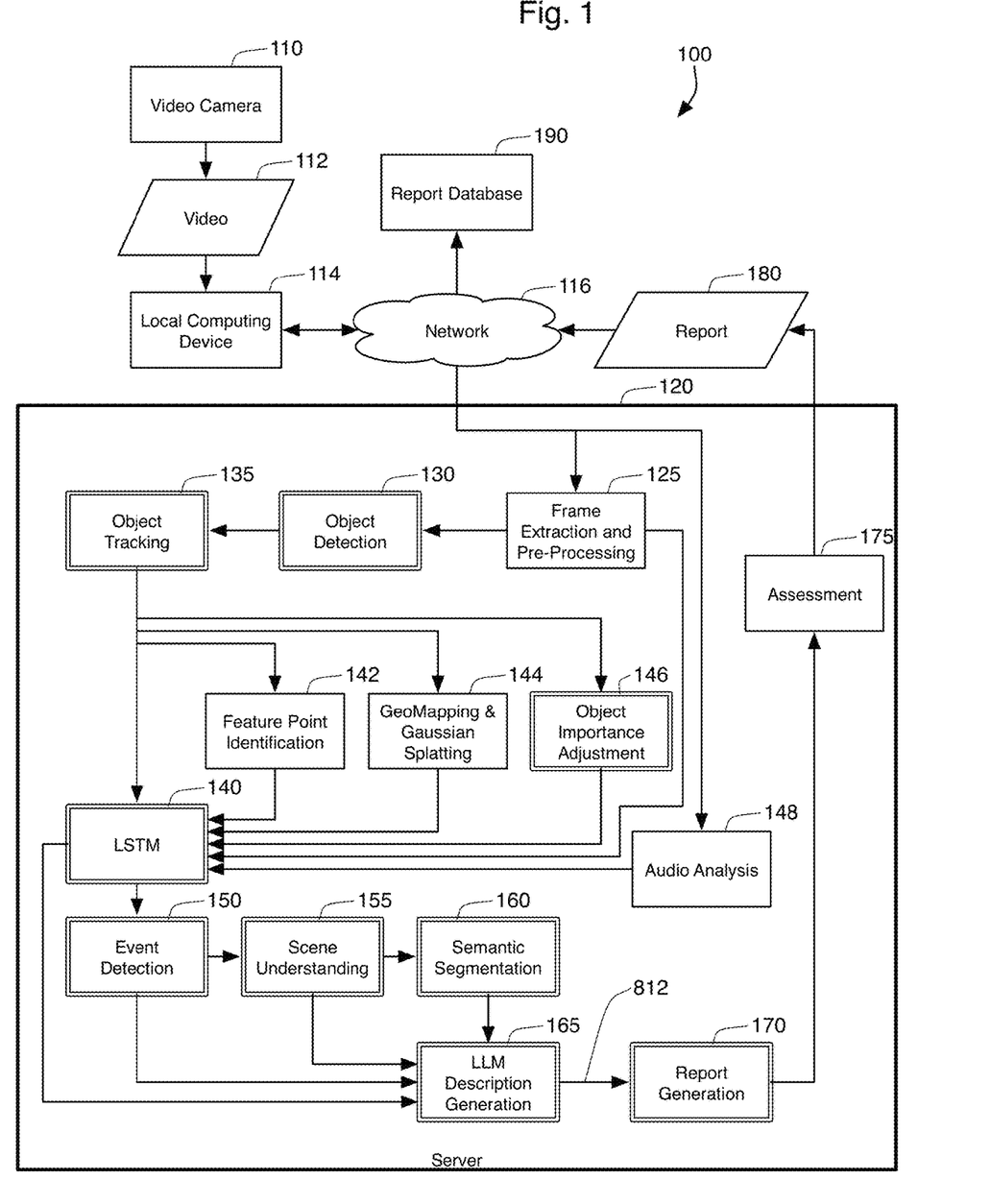
FIG. 1 is a schematic view of a system for transforming audio and visual content.

FIG. 1 shows a system 100 for implementing one or more embodiments of the present disclosure. The system 100 utilizes a video camera 110 that is designed to record a video 112. The video 112 can take the form of a video file, which is fully created and finalized after the video camera 110 has finished recording a scene, or a video stream, which comprises a live stream of video data. The video includes both audio data and multiple frames of image data.

The video 112 is received by a local computing device 114, which then forwards the video 112 over network 116 to a server 120. The server 120 is responsible for analyzing the video 112 in order to generate and return a report 180. The details as to the systems and methods performed by the server 120 are described below.

Both the local computing device 114 and the server 120 are computing devices. That means that each device includes a processor for processing computer programming instructions. In most cases, the processor is a CPU, such as the CPU devices created by Intel Corporation (Santa Clara, CA), Advanced Micro Devices, Inc. (Santa Clara, CA), or a RISC processor produced according to the designs of Arm Holdings PLC (Cambridge, England). The computing devices 114, 120 may take the form of a standard computer system, such as a laptop or desktop computer, or may take the form of a portable device, such as a tablet computer or smartphone.

These computing devices 114, 120 have memory, which generally takes the form of both temporary, random-access memory (RAM) and more permanent storage such as magnetic disk storage, FLASH memory, or another non-transitory storage medium. The temporary memory and storage (referred to collectively as "memory") contain both programming instructions and data. In practice, both programming and data will be stored permanently on non-transitory storage devices and transferred into RAM when needed for processing or analysis.

The network 116 can comprise a plurality of different networks or subnetworks, and can be accessed using a variety of techniques and protocols, such as through a local WiFi or Ethernet LAN, or through a cellular data network. In one embodiment, the network 116 includes the Internet.

The system 100 can store data in the report database 190 and retrieve previously stored data from that database 190. In some embodiments, the server 120 will create intermediate elements of data, such as transcripts or aggregate analysis of the video 112 or the reports. The database 190 may be, for example, incorporated into the other components shown in FIG. 1, such as within the server 120. The database 190 generally include defined database entities. These entities may be database tables, database objects, or other types of database entities usable with a computerized database. In the present embodiment, the phrase database entity refers to data records in a database whether comprising a row in a database table, an instantiation of a database object, or any other populated database entity. Data within the database 190 can be "associated" with other data. This association can be implemented using a variety of techniques depending on the technology used to store and manage the database, such as through formal relationships in a relational database or through established relationships between objects in an object-oriented database.

Example Environment

This ability to generate a report from the video 112 is useful in many environments. The provisional application incorporated above describes one such embodiment in connection with the use of system 100 by police officers. Law enforcement agencies often require officers to dedicate a significant portion of their working hours to documenting incidents through detailed written reports. Studies suggest that up to 40% of an officer's shift is spent on report writing, detracting from time that could be spent patrolling and responding to active situations in the community. With the growing adoption of body-worn cameras by approximately 80% of U.S. police departments, there exists an opportunity to leverage these devices not only for accountability and evidence collection but also to streamline the reporting process.

System 100 employs artificial intelligence to analyze the video 112 captured by body-worn cameras 110 and generate incident reports 180, thereby minimizing the redundant and time-consuming task of manual report writing. Upon recording an incident, the body camera's video feed 112 is uploaded to the processing server 120 where multiple generative AI engines analyze the footage. These engines extract relevant events and automatically generate a narrative, forming the foundation of the police report. To ensure compliance with the specific needs of individual law enforcement agencies, the server 120 is designed to adapt to different report structures, templates, and content requirements. The generative AI models are trained on the specific style, tone, and required information of the agency to produce reports that meet local standards. Some agencies may provide predefined templates for reports, while others may require the AI to learn the templates directly from existing report forms. This flexibility ensures that the generated reports are both accurate and aligned with agency expectations.

Once the AI-generated report 180 is prepared, it is presented to the officer through a user-friendly interface through the local computing device 114. The officer can quickly review the report, make necessary corrections, and approve it for submission. This review process allows officers to maintain accuracy while significantly reducing the overall time spent on documentation. After review, the finalized report is uploaded into the agency's report database 190, where it is stored for further use, including investigations, audits, and legal proceedings. The system 100 is designed to integrate seamlessly into the officer's workflow. The uploading of the video 112 can be initiated from various locations, including patrol cars, where local computing devices 114 facilitate the connection between the body camera 110 and the server 120. An intuitive interface on the computing device 114 simplifies the process, enabling officers to begin the analysis with minimal effort. By automating the reporting process and enabling remote uploads, the system 100 enhances operational efficiency while allowing officers to focus on active policing duties.

Server 120

As explained above, the server 120 comprises a computer device that is responsible for receiving video 112, analyzing that video 112 including an analysis of the visual frames and the audio in that video 112, and then generating a report 180. As shown in FIG. 1, server 120 utilizes a plurality of components. These components can take the form of software modules within a single application, or a plurality of applications working together. Furthermore, the computing device that comprises the server 120 may take the form of multiple, separate computers, each with its own processor and programming, operating in cooperation to analyze the received video 112 and producing the report 180. All of the separate elements shown in FIG. 1 for server 120 can be performed on a single computer, or each of the separate elements can each be performed on a separate computer. In some embodiments, what is shown as a single module in FIG. 1 can be performed on multiple computers. These computers may all be located in immediate proximity to each other, communicating, for instance, over a local area network (or LAN). Alternatively, these computers can be located remote from each other, communicating over network 116 or another wide area network (or WAN). Some of the modules may be offered by separate computing devices as a Software as a Service (or SaaS) to multiple clients, where the operations performed for the server 120 are performed in parallel with operations performed for unrelated clients. With all of these possibilities, these individual components can be referred to as applications, apps, services, modules, subprocesses, or methods. While some of these various names can be and are used in this disclosure, the different possible implementations of these components should not be considered limited by the use of such a name. In most instances, the individual components will simply be referred to as a component.

In some instances, the components of server 120 shown in FIG. 1 are outlined in a double-lined box, such as components 130, 135, 140, 146, 150, 155, 160, 165, and 170. As will be seen below, the process of producing the report 180 from the video 112 is best performed by using one or more artificial intelligence (AI) engines. More particularly, these AI engines are often best implemented through the use of generative AI (or GenAI). Those components identified with the double-lined box in FIG. 1 are those components that can be implemented through GenAI. In many cases, the use of GenAI is more than optional, as the preferred method for implementing those components is through GenAI. These individual components can be implemented as separately trained generative AI engines. Alternatively, it is frequently possible to combine the functionality of multiple GenAI engines into a single engine. The current description therefore will describe these as separate GenAI engines, but, unless explicitly stated otherwise, such language should be read to include the implementation of multiple GenAI engines into a single engine that receives inputs and generates an output.

Figure 2:
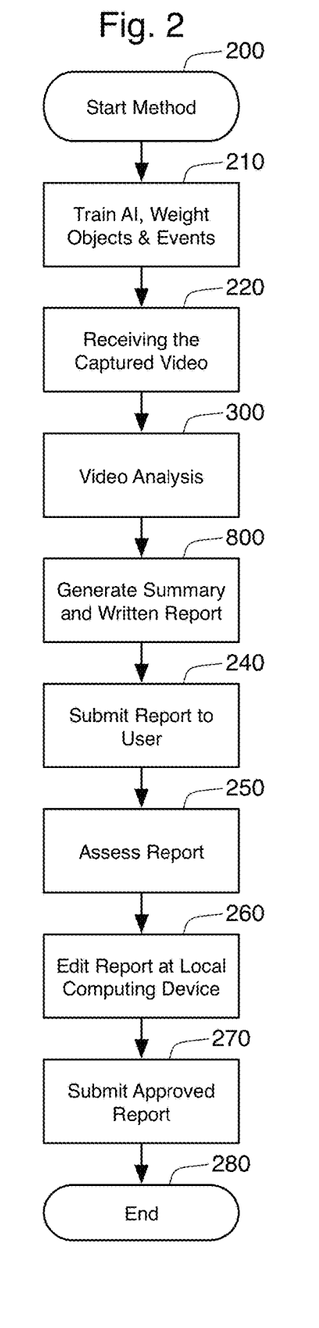
FIG. 2 is a flowchart showing a method for transforming audio and visual content.

The separate components in server 120 are best understood in the context of an overall method 200, as shown in FIG. 2. This method 200 has subprocesses that take the form of sub-methods, which are seen in the methods shown in FIGS. 3-8. The overall method 200 will be discussed first, with the individual methods of FIGS. 3-8 described in more detail below.

Overall Method 200.

Method 200 is responsible for analyzing the received video 112 from the local computing device 114 and generating the report 180. Thus, the method 200 will be performed on the one or more computers that make up the server 120. The method begins at step 210 with pre-training one or more of the GenAI engines that will perform the additional operations in this method 200. Additional details concerning the type of training involved will be provided for the AI engines as they are introduced in the discussion below. In general, when a generative AI engine needs to be specifically trained, it is trained using large datasets that include relevant data for the domain being analyzed. If the system 100 is used to process police body-cam video 112, for instance, the large data set will include historical police reports, video footage, and templates specific to law enforcement agencies. The training incorporates natural language processing (NLP) techniques for narrative generation, as well as computer vision models for visual analysis of the video footage. Periodic retraining or fine-tuning ensures the AI components adapt to evolving reporting standards and changes in agency requirements. Training data undergoes data augmentation to simulate diverse scenarios and reduce overfitting, ensuring the generative AI engines perform accurately under varied conditions. Additionally, bias detection and mitigation techniques are applied to avoid generating reports with unintended biases, enhancing fairness and reliability.

In the context of this application, the concept of pre-training an AI component at step 210 can encompass either the initial training of the component or the process of fine-tuning the component. While initial training involves training the generative AI engine on large, diverse datasets to develop a broad capability in tasks such as natural language generation and image recognition, fine-tuning is a secondary stage where the AI component is further adjusted using data that is more specific to the particular operational requirements of system 100. This fine-tuning phase refines the model's parameters and hones its performance by focusing on data that reflects the particular context in which the system 100 is used, such as recent police incident reports or procedural updates. Unlike the initial training phase, which establishes a foundational understanding of general patterns and language, fine-tuning is applied to optimize the model for specific contexts, thereby enhancing its accuracy and relevance in producing outputs directly aligned with the expectations and standards of the target domain. Fine-tuning also allows for incremental adjustments as reporting requirements evolve, ensuring that the generative AI engine maintains high reliability and responsiveness to domain-specific nuances without the need for comprehensive retraining from scratch.

The next step 220 is the receipt of the captured video 112, which is a required step before that video 112 can be analyzed by the server. The system is designed to be compatible with industry standards for video encoding and metadata tagging, such as H.264/265 for video streams and EXIF for embedded data. This will ensure seamless integration with existing technologies, such as the body-worn camera technologies and law enforcement databases used in the police context. One example of the type of metadata included in the video 112 includes an identification of the user who is associated with this video camera 110 (such as the particular police officer, or a unique identifier code that is assigned to that user through external data). Another type of metadata is geolocation data (such as precise longitude and latitude information) that identifies where the video 112 was recorded. If the video camera 110 is moving during the time that the video 112 is recorded, this movement will be recorded in this type of location metadata. In addition to geolocation data, temporal metadata is embedded within the video 112, aligning specific events with time information as to when the video was shot. This ensures that events recorded across multiple videos, such as those from nearby officers, can be synchronized for unified reporting and situational awareness.

The next step is the video analysis. This step is, of course, vital to the overall generation of the report 180, and is therefore discussed in detail below in connection with FIGS. 3-7 as method 300. As explained below, this method 300 is responsible for extracting individual frames for analysis, converting audio into a time-stamped transcription, identifying objects in the individual frames, recognizing and adjusting the importance of particular objects, analyzing the frames and the identified objects and audio transcription to create a temporal analysis, and then developing a contextual understanding of the events found in the video 112. After the video analysis of step 300, it is necessary to generate a written description of that analysis. This step also involves the operation of one or more GenAI engines and is described in more detail in connection with FIG. 8 as method 800. In a nutshell, method 800 is responsible for generating a written description of the events in the video 112, and then applying a report template to that written description in order to generate report 180.

At step 240, the report 180 created through method 800 is returned over network 116 to the local computing device 114. At this point, the user of the local computing device 114 is presented the report for review and editing. This can be accomplished, for example, by presenting the report 180 to the user through a tablet device 114. The interface presented on the tablet device 114 can include text editing functions such as those that are standard on word processing computer software. In the event that the AI-generated report 180 contains inconsistencies or lacks critical information, officers can edit the report manually through the local computing device 114. These edits are reported back to the server 120 to allow the system 100 to learn from those corrections, thereby improving the accuracy of future reports through iterative feedback loops and supervised learning updates.

After editing, step 250 will receive confirmation that the edited report is approved by the user. At this point, step 260 will submit the report. In one embodiment, the approved report is submitted to a report database 190 that receives all such reports. At this point, the entity operating the system 100 (or the entity for whom the system 100 is processing the video 112), such as a police department, can review, analyze, and act on that report.

The system ensures compliance with relevant legal and privacy standards, including secure data transmission protocols over the network 116. All video footage and reports are encrypted during transit and storage to protect sensitive information. Additionally, access to reports and video content is restricted through authentication protocols, ensuring only authorized personnel can review and edit the content. Furthermore, in some embodiments, the system 100 adheres to the Criminal Justice Information Services (CJIS) Security Policy, ensuring all transmitted and stored data meet stringent confidentiality and integrity requirements, as well AES-256 encryption protocols.

Video Analysis Method 300

Figure 3:
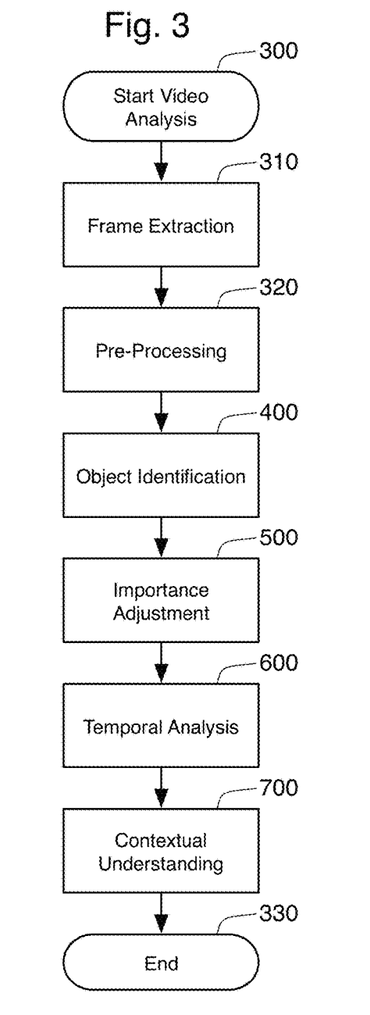
FIG. 3 is a flowchart showing a method for performing video analysis.

FIG. 3 shows the video analysis method 300. The method starts with the extraction of individual image frames from the video 112 at step 310. The identification of individual frames is required for the various AI engines utilized in the remainder of method 300. Each frame is uniquely identified in sequence, ensuring that consecutive frames can be identified and analyzed together to capture the temporal progression of events.

Each frame is then pre-processed at step 320. The pre-processing aids the later analysis of the frames by normalizing image properties such as brightness, contrast, and color balance to reduce variability introduced by environmental factors (e.g., changing lighting conditions or shadows). Additionally, noise reduction filters may be applied to remove artifacts, such as compression distortions or motion blur, ensuring cleaner inputs for downstream analysis. In this stage, the frames are also resized or cropped to meet the input requirements of the AI models, optimizing computational efficiency without compromising important visual information. Pre-processing at step 320 can further involve frame stabilization techniques if the video was captured during movement, reducing jitter and improving the consistency of object tracking across sequential frames. Since audio data is synchronized with the frames, step 320 will also extract corresponding audio segments for alignment with visual events.

Frame extraction and pre-processing is shown as component 125 in FIG. 1. This component 125 ensures that the frames are enhanced and prepared for feature extraction, object identification and tracking, and event analysis in subsequent steps.

Object Identification Method 400

Figure 4:
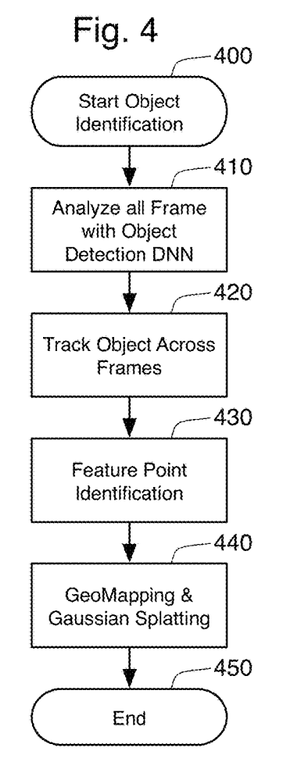
FIG. 4 is a flowchart showing a method for performing object identification.

The next step in the video analysis method 300 is the object identification method 400, which is shown in detail in FIG. 4. The object identification method 400 begins by analyzing all the frames extracted and pre-processed by component 125 with an object-detection component 130. The double-line box shown in FIG. 1 around the object-detection component 130 indicates that the use of generative AI will be beneficial in identifying objects within the frames. In particular, known GenAI-based object detection models such as You Only Look Once (YOLO) and Single Shot MultiBox Detector (SSD) can be employed as the object-detection component 130.

Both YOLO and SSD offer distinct advantages. YOLO performs global analysis on the entire frame in a single pass, achieving high-speed detection by simultaneously identifying multiple objects and predicting their bounding boxes. This makes it ideal for dynamic, real-time scenarios captured by body-worn cameras. On the other hand, SSD divides the frame into a grid and assigns default bounding boxes at different scales, allowing it to detect objects of varying sizes more effectively, particularly when precision in complex environments is required.

The object-detection component 130 generates confidence scores for each detected object, indicating the likelihood that the identified object matches predefined categories. For law enforcement purposes, the object-detection component 130 may be trained or fine-tuned to detect relevant objects, such as weapons, vehicles, license plates, or personal belongings, which can be used as evidence or contextual elements in the final report. Each detected object is assigned a class label and associated with a bounding box that outlines its location within the frame.

To enhance detection accuracy, the component utilizes techniques such as non-maximum suppression (NMS) to eliminate redundant bounding boxes, ensuring that each object is captured only once per frame. The identified objects and their associated metadata, such as position, movement, and confidence scores, are passed on to subsequent components for contextual and temporal analysis.

The next step 420 involves the use of an object tracking component 135 to maintain continuity of objects identified by the object-detection component 130 across consecutive frames. This step ensures that detected objects are consistently followed over time, even as they move through the scene or change positions within the video. In one embodiment, the system employs the Simple Online and Realtime Tracking (SORT) algorithm or the DEEP SORT algorithm to handle object tracking efficiently and accurately. SORT utilizes Kalman filters to predict the future locations of objects based on their past trajectory, facilitating smooth tracking from frame to frame. It operates by identifying bounding box overlaps between consecutive frames, which allows it to associate each detection with the same object across time. SORT's lightweight design makes it highly suitable for real-time applications, particularly when computational resources are limited or low-latency processing is required. However, in scenarios with complex object interactions, such as individuals crossing paths or objects temporarily disappearing from view, the system can employ DEEP SORT for more robust performance. DEEP SORT extends SORT by incorporating appearance-based features using a convolutional neural network (CNN). As a result, it not only relies on spatial proximity but also associates detections with a unique visual fingerprint of the tracked object. This capability allows the system to maintain accurate tracking even when objects are occluded (blocked from view) or when they re-enter the frame after being out of sight. In most embodiments, the DEEP SORT algorithm is currently preferred.

Since DEEP SORT leverages CNNs for appearance-based feature extraction, the object tracking component 135 is represented with a double-line box in FIG. 1, indicating the incorporation of generative AI techniques. The CNN enables the algorithm to differentiate between visually similar objects, minimizing confusion between entities in crowded environments or fast-moving scenes. For example, DEEP SORT ensures that if multiple individuals in similar uniforms are detected, the system can accurately track them based on subtle appearance differences, such as accessories or color variations. The tracking component 135 assigns persistent IDs to each object, ensuring that the system can maintain a consistent identity for every detected entity across the video sequence. This process guarantees that key objects, such as a suspect, weapon, or vehicle, are consistently tracked from the moment they are first detected until they leave the frame or the video ends. Persistent IDs also facilitate cross-referencing with other metadata, such as license plate numbers or officer notes, to enhance the system's analytical capabilities.

In addition to identity management, the tracking component records key movement metrics, including trajectories, velocity profiles, and directional changes of tracked objects. This data helps create a comprehensive picture of object behavior across time, such as identifying sudden accelerations or changes in movement patterns. For instance, the system can determine if a vehicle accelerates rapidly in a particular direction or if an individual exhibits erratic movement patterns, which may signal attempts to evade law enforcement. These movement metrics are stored as metadata associated with the tracked object and are made available for further processing in subsequent analysis steps. This information lays the foundation for interpreting incident dynamics and contributes to building a coherent narrative of the events captured on video.

Step 430 involves feature point identification, implemented by component 142 as shown in FIG. 1. This step plays a critical role in improving the system's ability to track objects consistently across time, particularly in challenging scenarios where conventional object-detection models like YOLO and DEEP SORT may struggle to maintain continuous tracking. Note that the feature point identification component 142 is shown as receiving input directly from the object tracking component 135. Such input could prove useful, and hence it is shown in FIG. 1. In other embodiments, however, the feature point identification component will simply receive the output from the frame extraction and pre-processing component 125.

Body-worn cameras often produce low-quality, high-motion video, which introduces challenges such as motion blur, inconsistent lighting, and rapid object movements. In certain cases, objects might appear partially occluded (e.g., through glass windows or when doors are opened), or they might enter and leave the frame frequently. These conditions make it difficult for traditional object-detection methods to reliably persist objects across frames, increasing the risk of gaps in object tracking.

To address these challenges, the feature point identification step identifies distinct visual landmarks or key points on objects, which remain stable across multiple frames. These feature points may correspond to unique visual characteristics, such as the contour of an object, corners, or texture patterns. By extracting and associating feature points with objects over time, the system provides a secondary layer of tracking that complements DEEP SORT's appearance-based tracking. This approach ensures that objects remain consistently tracked, even if their bounding boxes change shape, overlap with other objects, or are temporarily lost due to movement or occlusion.

At step 440, geomapping and Gaussian splatting techniques are applied to enhance the analysis of individual frames. These processes occur at component 144 in FIG. 1 and provide additional spatial and contextual understanding of events captured by video camera 110. Geomapping leverages the GPS data recorded by the camera 110 to establish the precise latitude and longitude coordinates of events within the video. This feature ensures that events are accurately associated with their true physical locations, reducing the risk of misattribution. For example, if a suspect is tracked across multiple locations during an incident, geolocation-enhanced data created by component 144 ensures that these movements are accurately reflected, preventing any false assertion that the entire event occurred in a single place. The integration of GPS metadata allows the system to build a map overlay, which can visualize the spatial relationship between different key events in the video 112. This spatial data also ensures that chronological and spatial accuracy is maintained in the final report.

The Gaussian splatting technique offers a more advanced, optional approach for reconstructing a 3D spatial model from the video 112. This technique involves projecting the 2D video frames into 3D space by applying Gaussian splatting algorithms, which aggregate feature points into a continuous surface. Gaussian splatting creates a probabilistic model that represents objects and their spatial relationships with depth, accounting for uncertainties such as partial occlusion or ambiguous object boundaries. This 3D spatial model can provide valuable insights, especially in scenarios where the proximity of individuals or objects is critical to the analysis. For example, Gaussian splatting can answer questions such as, "How close was a combatant to the officer when a weapon was drawn?" or "Was an individual within striking distance with a knife?" By tracking objects in 3D space, the system allows law enforcement to visualize the spatial dynamics of the incident, aiding in both real-time decision-making and post-event analysis.

While the use of Gaussian splatting for full 3D reconstruction may initially serve as a data collection tool for later analysis in method 300, it offers significant potential for enhancing an interface provided by local computing device 114 or by a computer accessing an approved report from the report database 190. This capability ensures that investigators or analysts can revisit the reconstructed scene to conduct further examination, such as trajectory analysis or range assessments. Even if Gaussian splatting is not fully implemented in all deployments, the groundwork established by capturing and analyzing 3D spatial data will allow for incremental improvements to the system's functionality over time.

The combination of geomapping and Gaussian splatting at step 440 ensures that the system delivers a comprehensive analysis of both the location and spatial relationships within an incident. This enables the server 120 to produce reports that reflect not only what happened but also where and how objects or individuals interacted within the scene. The object identification method 400 then ends at step 450.

Importance Adjustment Method 500

Figure 5:
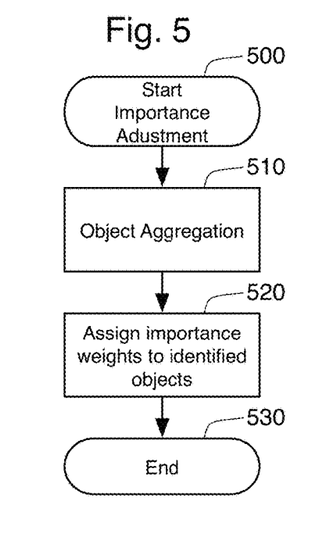
FIG. 5 is a flowchart showing a method for performing object importance adjustment.

Returning to FIG. 3, after object identification 400, method 300 proceeds to the importance adjustment method 500, illustrated in FIG. 5. This method involves two key steps: object aggregation and importance weighting. The first step, step 510, aggregates all objects identified across the video frames by the object identification method 400.

During this step, the system collects metadata for each object, including presence duration (i.e., how many frames the object appears in), movement patterns, and the velocity of those movements. Some objects may appear consistently throughout the entire video, while others may only appear intermittently—for example, being visible at the beginning and reappearing near the end of the footage. This aggregation ensures that the system has a comprehensive dataset on each object's behavior across the video's timeline.

The second step, step 520, utilizes the aggregated data to assign an importance weight to each identified object. This importance weighting is important during analysis of a new video 112, enabling the system to adapt to contextual changes within the video as new events unfold. A recurrent neural network (RNN) is employed to assign these weights, as indicated by the double-lined box around object importance element 146 in FIG. 1, denoting the use of a GenAI engine. The RNN's temporal capabilities allow it to analyze objects in sequence and track their changing relevance over time. The RNN can dynamically adjust an object's importance based on its behavior across frames, ensuring that unexpected developments are captured in the report. This dynamic approach prevents the system from prematurely discarding relevant objects based on early assumptions and ensures it stays sensitive to evolving contextual significance throughout the video.

In real-time analysis, objects that initially seem trivial—such as a coffee cup or mobile phone—may later become significant if their role changes (e.g., the cup is thrown at an officer). For instance, a gun briefly visible in the footage will still receive a high importance score due to its inherent relevance, while a coffee cup seen for only a moment will generally receive a low score. However, if that same coffee cup is held for an extended period or becomes part of an incident—such as being used to throw hot coffee at an officer—it will receive higher weight due to its prolonged exposure or new interaction context.

In alternative embodiments, the object importance element 146 can employ a rule-based approach. Such a component would rely upon the object identification method 400 to accurately identify and label objects over time and their movements. The rule-based object importance element 146 would identify particular objects that are always of more relevance in the context of the system 100 (such as a weapon in the context of police-related videos) as well as objects that are of more relevance based on their analyzed movements. This type of object importance element 146 would not, of course, be considered a generative AI component.

The importance weighting of step 520 can also be used to support system training, where historical data from previous police reports helps the neural network classify objects according to their relevance within a given context. Objects like weapons, vehicles, or contraband are inherently assigned high importance, as they frequently appear in critical incidents. Conversely, personal items may initially receive low importance unless their role changes within the video.

Temporal Analysis Method 600
LSTM 140

Figure 6:
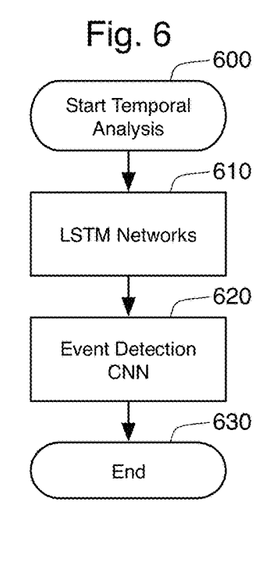
FIG. 6 is a flowchart showing a method for performing temporal analysis.

After the importance adjustment method 500, the video analysis of method 300 proceeds to perform a full temporal analysis according to method 600, shown in FIG. 6. This temporal analysis method 600 involves two sequential steps: analysis by a trained Long Short-Term Memory (LSTM) component 140 at step 610, followed by analysis by a trained event detection engine 150 at step 620. The LSTM component 140 plays a critical role in the first step, serving as an important tool for the server 120 to analyze the temporal dynamics of the identified objects and events. A Long Short-Term Memory network component 140 is a type of recurrent neural network (RNN) designed to process sequential data and capture long-term dependencies. LSTMs are uniquely capable of managing complex patterns that unfold over time, which makes them particularly useful in scenarios where context builds across multiple frames, such as video analysis. Traditional RNNs often struggle with the vanishing gradient problem, where early inputs are lost as the sequence progresses. LSTMs solve this issue by incorporating gating mechanisms (input, forget, and output gates) that regulate the flow of information, ensuring relevant context is retained throughout the analysis. In this system, the LSTM helps track how the importance and behavior of objects change over time, identifying patterns that may not be apparent in individual frames.

As shown in FIG. 1, the LSTM component 140 receives input from several upstream components to ensure comprehensive temporal analysis. These inputs include:

1) Frame Extraction and Pre-Processing 125 and Audio Analysis Component 148: The LSTM 140 is able to directly analyze frame image data that is extracted and enhanced by component 125. In addition, an audio analysis component 148 converts spoken words from the video's audio into textual data that the LSTM can incorporate into its analysis. For instance, the LSTM component 140 can link verbal commands from officers with corresponding movements or behaviors from individuals. This integration allows the system 100 to align audio cues with visual events, such as identifying whether a suspect complied with or ignored an officer's instructions. The audio analysis component 148 is also responsible for identify non-spoken sounds, such as car engines, weapon discharge noises, background noises, and non-verbal human utterances.

2) DEEP SORT Object Tracking Component 135: The DEEP SORT component 135 provides continuous tracking data for each detected object, including persistent IDs, movement trajectories, and velocity information. This data helps the LSTM component 140 capture behavioral patterns over time, such as tracking whether an individual object changes speed, direction, or engages with other objects during the incident.

3) Feature Point Identification Component 142: The feature points from this component provide an additional layer of object persistence, ensuring that objects are not lost even when occluded or out of the camera's view. These feature points allow the LSTM component 140 to reconstruct object behavior with higher accuracy, filling gaps in tracking data where bounding boxes may have failed to capture continuous movement.

4) Geomapping and Gaussian Splatting Component 144: The spatial data provided by component 144 enhances the LSTM's ability to analyze objects in relation to their location and distance from other objects. For example, this location data can assist the LSTM component 140 in identifying that a suspect is closing in on an officer or moving toward a weapon. This allows the LSTM component 140 to flag this behavior for further analysis by the event detection engine 150.

5) Object Importance Element 146: The importance weights calculated by element 146 allow the LSTM to prioritize certain objects in its temporal analysis. Objects with higher weights—such as weapons or suspicious items—receive more focus, ensuring that significant changes in their behavior are identified and described in detail. This helps the system 100 avoid being overwhelmed by unimportant or transient objects.

The LSTM component 140 may be designed as a multi-modal analysis engine, capable of processing and analyzing both audio and visual data simultaneously. In this configuration, the LSTM directly ingests sound data alongside the video frames, allowing it to integrate non-verbal auditory cues—such as sudden noises, gunshots, sirens, or footsteps—into its temporal analysis. This multi-modal capability offers a more nuanced understanding of the incident by capturing both what is seen and heard, ensuring that critical events are not overlooked due to an isolated focus on visual elements. With a multi-modal LSTM, the importance of an audio analysis component 148 is reduced, as the system can process raw audio signals directly. While spoken words may still be transcribed for documentation purposes, the LSTM's ability to recognize patterns in non-speech audio—such as changes in ambient noise, the tone of voices, or mechanical sounds—enables it to detect significant events without relying solely on text output. For example, the system might recognize an escalation in tension based on raised voices, the sound of a weapon being drawn, or the sudden opening of a door, correlating these cues with visual events to enhance situational awareness.

The multi-modal LSTM offers additional benefits by analyzing the temporal alignment between audio and visual inputs. It can detect and synchronize events such as verbal commands and corresponding physical actions, identifying whether an individual complied with an officer's instructions or exhibited non-compliant behavior. Additionally, non-verbal sounds—such as a breaking window or a vehicle accelerating—can be recognized and cross-referenced with visual data to clarify ambiguous events. By incorporating multi-modal inputs, the LSTM provides a richer temporal analysis that captures subtle, context-dependent events that might otherwise go unnoticed. This capability ensures that both audio and visual elements are considered in generating the final incident report, making the analysis more comprehensive and accurate.

However, a non-multi-modal LSTM component 140 is also contemplated for use in the system 100, and such a component 140 may be even more reliant on the different inputs identified above and in FIG. 1. Such an LSTM 140 will rely upon the features identified by the other GenAI components identified above in order to analyze temporal dependencies across frames of the received video 112. In some embodiments, the LSTM will receive primarily text-based inputs from the other systems. In such an embodiment, the text-based LSTM 140 analyzes sequences of structured textual data received from the various inputs. This text-based LSTM receives processed outputs from various GenAI components responsible for object detection 130 and object tracking 135, as well as audio transcripts that capture spoken words or environmental sounds associated with the video footage at component 148. The LSTM processes these textual inputs as a continuous sequence, leveraging its capability to capture temporal dependencies and contextual relationships across multiple events. By using a text-based mode, the LSTM can interpret high-level descriptions of detected objects, actions, and sounds in a cohesive, time-ordered manner, providing insights into how specific visual events align with verbal cues or other contextual information. This configuration allows the LSTM to maintain an understanding of the video's narrative, recognizing patterns and sequences that unfold over time, without the need to reprocess raw visual frames or audio data.

Regardless of its particular configuration, the LSTM engine 140 is responsible for conducting a comprehensive temporal analysis, capturing the evolving context, interactions, and behaviors of objects throughout the video. The LSTM generates a contextual timeline that tracks the movement, relevance, and interactions of key objects over time. This timeline includes temporal labels that mark significant moments—such as escalating behavior, suspicious movements, or recurrent interactions—that are critical to the final report.

Event Detection Component 150

The timeline output from the LSTM engine 140 serves as input to the event detection component 150, which converts this output at step 620 into a detailed sequence of events. The event detection component 150 can also take the form of a trained neural network, such as a convolutional neural network (CNN), optimized to detect and classify individual actions and occurrences captured in the video. The event detection component 150 is trained to identify specific events based on patterns in the input data, including actions such as jumping, throwing an object, or closing a door. Unlike the LSTM component 140, which focuses on capturing temporal patterns and interactions, the event detection component 150 excels at recognizing discrete events and correlating them with specific timestamps in the video. The goal of this step 620 is to track events as they unfold, creating a time-stamped log of individual actions that provides granular insight into what occurred during the incident.

This step 620 emphasizes the need for dense contextual input to ensure that the server 120 can accurately detect and classify events. Although the output from the LSTM component 140 provides a foundation by identifying significant objects and their interactions, the event detection component 150 is designed to enrich this analysis by adding finer details about specific events. For example, it can determine not only that an individual was holding an object but also whether that object was thrown, dropped, or passed. Similarly, the event detection component 150 can identify changes in environmental elements, such as doors opening or closing, based on the shifting visual patterns in the video frames.

The combination of LSTM component 140 and event detection component 150 outputs ensures that the system captures a comprehensive timeline of relevant events with precision. This provides critical raw data for downstream processes, ensuring that the subsequent scene understanding analysis will be based on rich, detailed event logs that include both visual and temporal insights. The temporal analysis method 600 then ends at step 630

Contextual Understanding Method 700

Figure 7:
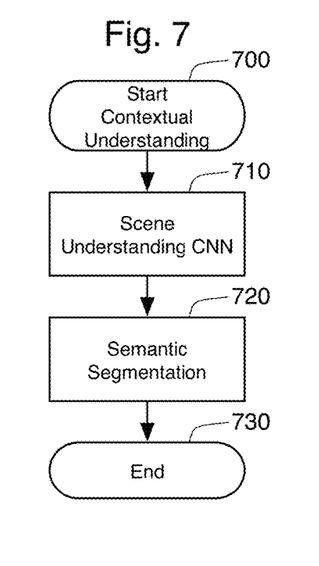
FIG. 7 is a flowchart showing a method for performing contextual analysis.

The next step in method 300 is the contextual understanding method 700 shown in FIG. 7. This method 700 also involves two separate steps, mainly applying a scene understanding component 155 at step 710, and then applying a semantic segmentation component 160 at step 720.

The scene understanding component 155 takes as input the narrative created by the LSTM component 140, including the description of tracked objects identified in earlier stages of method 300 and provides a holistic interpretation of the environment and interactions depicted in the video 112. While object detection 135 and the timeline output of the LSTM component 140 focus on identifying discrete objects and events, scene understanding offers a broader contextual analysis, allowing the system to interpret relationships, spatial arrangements, and the higher-level meaning of the observed activities. The objective is to not only catalog what is present and what has happened but also to comprehend the overall context in which these events occur. This component answers practical questions like:
- What type of environment is being depicted (e.g., urban street, park, or indoor setting)?
- What functional zones exist within the scene (e.g., sidewalks for walking, roads for driving)?
- How do objects fit into their environmental context (e.g., people walking on sidewalks, cars on the road)?
- What is the functional role of the objects (e.g., is a vehicle parked or in motion, or is a dog behaving randomly or following someone)?

The scene understanding engine layers on top of object detection and sequential event tracking, incorporating contextual cues, spatial relationships, and functional semantics. This makes the system capable of interpreting the purpose and significance of interactions between objects and their environment.

Scene understanding component 155 provides contextual awareness by situating individual events within the broader environment. For example, while object detection and timeline tracking might identify a car avoiding a dog, scene understanding determines whether this interaction occurred on a highway, in a parking lot, or on a residential street. Such distinctions are crucial, as the interpretation of events varies significantly with the environment. In addition, scene understanding can classify environments based on features such as roads, walkways, or indoor areas, helping the system predict appropriate behavior. For instance, it is expected that a car will slow down when approaching a pedestrian crossing, but not on an open highway. Recognizing the scene type also improves decision-making by providing informed predictions about expected future events based on the environment and identifying unexpected alterations in the timeline.

Another key role of scene understanding component 155 is dividing the environment into functional zones, such as roads, pedestrian walkways, parking areas, or recreational spaces. These zones provide essential context for interpreting object behavior. For example, a person walking on a sidewalk is not cause for concern, but the same person walking on a road might indicate an unusual or hazardous situation. By identifying these functional regions, the system gains the ability to differentiate normal behavior from potentially dangerous or non-compliant behavior.

The scene understanding component 155 may utilize a trained convolutional neural network (CNN), optimized to process spatial and contextual information. The CNN analyzes the relationships between objects, their environments, and the events they participate in to generate a high-level interpretation of the scene. This deeper understanding ensures that the server 120 can provide meaningful insights for subsequent reporting. Ideally, the training for the scene understanding component 155 is specific to the context in which the system 100 is being used. In some instances, only fine-tuning is necessary, but such fine-tuning of the CNN can greatly increase the performed of the scene understanding component 155. In the context of police-related videos 112, a fine-tuning to understand the typically situations encountered by police officers will help the scene understanding component 155 create better results.

At step 720, the semantic segmentation component 160 provides fine-grained spatial detail about those objects and their exact placement within the scene. While scene understanding at step 710 captures macro-level relationships—such as determining that a person is crossing a road or waiting at a bus stop—semantic segmentation offers micro-level precision, identifying the boundaries of individual objects (e.g., differentiating between a pedestrian and a shadow) and dividing the scene into meaningful regions and subregions. In one embodiment, a U-NET neural network is employed to perform semantic segmentation at step 720. U-Net is a fully convolutional network (FCN) designed for semantic segmentation tasks, originally developed for medical image segmentation but widely used across various fields. The semantic segmentation component 160 receives video frames from the frame extraction component 125, and divides each video frame into pixel-level categories, ensuring that every pixel in the scene is assigned a specific label (e.g., "road," "pedestrian," "vehicle," or "grass"), creating a detailed segmentation map of the environment. Unlike the object detection performed by object-detection component 130, which identifies bounding boxes around objects, the semantic segmentation component 160 offers a pixel-accurate delineation of those objects, making it easier to understand where an object starts and ends. This precision enhances the output of the scene understanding component 155 by providing spatial data at the finest possible resolution. In particular, the semantic segmentation component 160 ensures that functional zones (e.g., roads, crosswalks, sidewalks) are precisely delineated, helping the system differentiate between expected and anomalous behavior. For instance, semantic segmentation can confirm whether a pedestrian is truly on a crosswalk or walking dangerously in a traffic lane.

In complex environments with overlapping objects or ambiguous regions (e.g., shadows, reflections, or obstructions), The semantic segmentation component 160 provides clarity by segmenting objects down to the pixel level. This reduces misclassification risks and enhances the accuracy of scene understanding by ensuring that objects are accurately recognized, even when partially occluded. Furthermore, by supplementing tracked objects with segmentation masks, the server 120 gains a more detailed understanding of the exact movement and interactions of those objects. For example, if a vehicle swerves to avoid a pedestrian, semantic segmentation provides precise information about where the pedestrian was positioned at every moment, improving the event detection engine's accuracy.

Together, the scene understanding component 155 and semantic segmentation component 160 offer a comprehensive analysis of the environment. While scene understanding provides the contextual relationships between objects and events, semantic segmentation ensures that each object is precisely mapped within the scene. This dual-layer approach enables the system to generate reports 180 that capture both the broad context and the minute details of an event. Nonetheless, in some embodiments, the semantic segmentation component 160 is optional. When it is not implemented, the contextual understanding method 700 relies solely on the application of the scene understanding component 155 at step 710.

Report Generation Method 800

Description Generator Component 165

Figure 8:
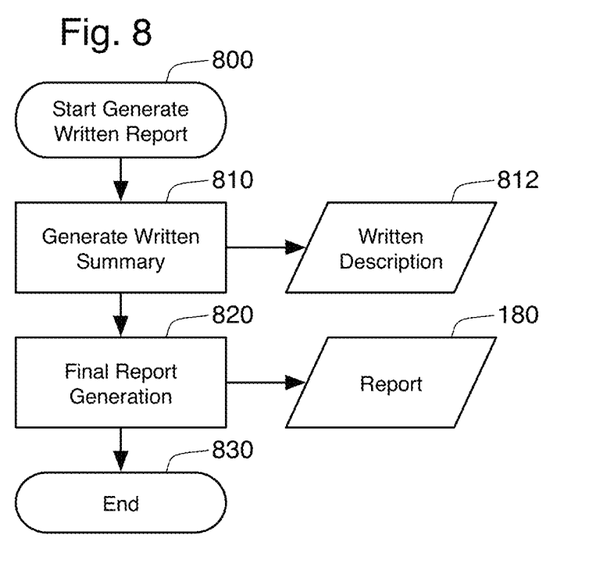
FIG. 8 is a flowchart showing a method for generating a written report.

Returning to FIG. 2, it is seen that after the method 300 completes its video analysis at step 330, the next step is the report generation method 800, shown in FIG. 8. This method 800 is responsible for transforming the analysis performed by method 300 into the final report 180. The process begins with step 810, which utilizes the description generator component 165 to convert the structured video analysis data from method 300 into a written description 812. This output 812 provides a human-readable, coherent narrative of the events and scenes depicted in the video 112.

The description generator component 165 operates as a generative AI engine, specifically leveraging a large language model (LLM). LLMs are well-suited for this task due to their ability to understand complex, structured data and generate natural language output that accurately reflects the input information. By applying natural language processing (NLP) techniques, the LLM synthesizes the results of the preceding analyses—including object detection, event detection, scene understanding, and semantic segmentation—into a narrative that mirrors human-written reports. The LLM's generative capabilities enable it to recognize relationships between objects, actions, and context, ensuring that the descriptions are both accurate and contextually meaningful. The use of a generative AI engine also allows the system to handle nuanced scenarios, ensuring that subtle behavioral changes and temporal progressions are incorporated seamlessly into the narrative.

The description generator component 165 receives input from various components of server 120 that were described in connection with method 800. These inputs will include output created by the LSTM component 140, which supplies temporal insights into the evolving behavior and interactions observed throughout the video 112. The LSTM component 140 tracks patterns of behavior over time, identifying sequences such as an officer issuing commands and a suspect's responses, along with any shifts in behavior that occur. For instance, the LSTM component 140 might capture that a suspect initially complied by raising their hands but later reached toward their pocket, signaling a potential escalation. These temporal insights provide essential context, ensuring that subtle developments across the video sequence are incorporated into the final report. The event detection component 150 also contributes input into the description generator component 165 by identifying specific actions, such as an officer ordering a suspect to step away from a vehicle or issuing a warning. The scene understanding component 155 enhances this input by providing contextual information about the environment, such as whether the incident occurred in a parking lot, on a residential street, or in a public park. Meanwhile, the semantic segmentation component 160 offers pixel-level spatial data, delineating the precise boundaries and locations of objects within the scene (e.g., identifying that the suspect stood near the vehicle's driver's door and that the officer was positioned in front of the vehicle). Together, these inputs form a rich dataset that captures what objects are present, how they behave, and how they interact within the environment.

Note that the description generator component 165 can sometimes accept multi-modal input. Thus, it can take advantage of textual descriptions provided by the other components while also analyzing enhanced frames from component 125, audio from the underlying video 112, or enhanced visual outputs that might be generated semantic segmentation component 160. In other embodiments, the inputs into the description generator component 165 are primarily textual. In either case, this data to the description generator component 165, it undergoes preprocessing and formatting to align with the requirements of natural language generation by the description generator component 165. The input may summarize the scene context (e.g., the interaction occurred on a residential street at night), identify objects and their movements (e.g., the officer approached the suspect standing near a parked vehicle), and specify key events (e.g., the officer instructed the suspect to move away from the vehicle). The spatial relationships identified through semantic segmentation component 160 ensure that the narrative captures precise object positions and their roles within the interaction. All of this data will be time stamped and geo-located.

Once the structured data is prepared and input into the description generator component 165, the description generator component 165 generates natural language descriptions that align with the scene's context and capture the temporal progression of events. The generated narrative reflects both actions and interactions between objects over time. For example, it might describe the sequence as: "The officer approached the suspect and stopped near the right, rear corner of vehicle. The suspect was standing about three feet from the vehicle by the driver's side door. The officer gave an order to "step away from the vehicle." The suspect briefly complied but then reached toward his pocket. In response, the officer issued a verbal command to stop and reached for his Taser." The description generator component 165 ensures that the report reflects causal relationships between actions, such as noting that the officer's decision to draw the taser was prompted by the suspect's unexpected movement. This ability to integrate time progression, spatial relationships, and causal links ensures that the written description 812 is comprehensive, logically coherent, and actionable.

The use of the description generator component 165, leveraging a generative AI engine such as an LLM, offers significant advantages over traditional report generation methods. The LLM's ability to process complex, structured inputs and generate natural language output ensures that the narrative aligns with the specific requirements of the environment, such as law enforcement, by producing descriptions with appropriate tone, structure, and detail. Additionally, the LLM recognizes and incorporates causal relationships between events, ensuring the resulting narrative is both logically coherent and easy to interpret. This automated report generation significantly reduces the time and effort required for manual report writing while maintaining high standards for completeness, accuracy, and clarity. The final narrative generated by the description generator component 165 is comprehensive, actionable, and well-suited for use in incident reports, summaries, and legal documentation.

Report Generation Component 170

The next step 820 in the written report generation method 800 is to submit the written description 812 created by the description generator component 165 to the report generation component 170. This component 170 is responsible for transforming the generic written description 812 into the final report 180, ensuring that the report conforms to the specific format, style, and content requirements of the organization for which the system 100 is operating. The final report 180 must meet the standards specified by that organization, which may vary significantly between different police departments, regulatory agencies, or private companies. For example, when the user is a police officer, the report generation component 170 ensures that the final report 180 follows the template required by that particular police department. This process involves aligning the structure of the written description 812 with predefined sections, headings, and content requirements, such as incident summaries, time and location details, involved parties, and officer statements. Since report templates and formatting preferences can vary between agencies, the report generation component 170 must be adaptive, capable of tailoring the content to align with the specific guidelines and submission requirements of the relevant organization.

The template used by the report generation component 170 may be generated in several ways. In one embodiment, the template can be predefined and directly provided by the organization, allowing the report generation component to populate it with relevant details from the written description 812. Alternatively, the the report generation component 170 is trained on historical reports from the agency to automatically infer the required template format. This training process can involve human-in-the-loop validation, where human reviewers evaluate whether the generated reports correctly follow the agency's standards and provide feedback to improve the accuracy and alignment of the generated reports.

The report generation component 170 ensures that the final report 180 is not only structurally compliant but also contextually relevant. For instance, it adjusts language and phrasing to match the style and tone preferred by the organization, ensuring that the report is clear, professional, and suitable for official use. In the case of law enforcement, this might include ensuring the use of precise terminology required in police reports, adherence to legal standards, and the inclusion of any necessary statements or declarations. This also ensures that the final report 180 meets both the content and formatting requirements of the organization, streamlining the documentation process and ensuring that the report is immediately usable for investigative, legal, or administrative purposes.

Report Analysis, Editing, and Submission

Once the report generation component 170 completes its transformation of the written description 812 into the final report 180, the resulting report is ready for submission to the user. The generate written report method 800 concludes at step 830, and the report 180 is submitted to the user operating the local computing device 114 over the network 116, as shown at step 240 on FIG. 2 and in FIG. 1. Within the server 120, however, the final report 180 is subject to further analysis by the assessment component 175 at step 250.

The assessment component 175 serves multiple purposes, ensuring both system performance evaluation and behavioral analysis. One primary function is to evaluate whether the weighting mechanisms applied by earlier components, such as the object importance element 146, effectively influenced the final report. This analysis ensures that the system 100 is accurately prioritizing key events and objects, helping identify potential areas for improvement in the LSTM 140, event detection component 150, and scene understanding module 155. If certain events or objects were not given appropriate weight, the assessment component 175 can flag these discrepancies, enabling further fine-tuning of the AI engines to improve future reports. In addition, the assessment component 175 can evaluate whether the language and structure of the generated reports align with organizational standards. It might analyze whether the tone, phrasing, and terminology used in the final report 180 match the requirements of the agency and flag any deviations that need correction. This ensures that the reports remain consistent and professionally appropriate, regardless of who reviews or uses them Beyond system evaluation, the assessment component 175 also analyzes the behaviors of individuals described within the report, particularly those of law enforcement officers or other involved parties. It examines whether officers behaved as expected in response to specific events and identifies whether there are teachable moments that could enhance future decision-making. For example, the component 175 might assess whether an officer followed standard protocols when interacting with a suspect or whether there were missed opportunities for de-escalation. This type of behavioral analysis provides valuable feedback that can inform training programs or policy adjustments. The assessment component 175 can also identify patterns of behavior over time by analyzing multiple reports. For instance, it might detect recurring scenarios where certain protocols were not followed or where specific interventions consistently led to positive outcomes. This insight could guide the development of new training programs or adjustments to existing procedures to ensure better alignment with desired outcomes. The system 100 may also provide performance metrics based on these reports, such as how efficiently officers respond to incidents or whether events are appropriately documented.

At step 260, the local computing device 114 presents an interface for the user to review and edit the report 180 as necessary. This interface allows the user to make corrections, add missing details, or modify the language and structure of the report to ensure it aligns with organizational standards. The interface may include standard text editing tools similar to those found in word processors, providing options to edit text, insert comments, or flag sections for further review. The interface ensures that the user retains final control over the content and accuracy of the report 180, enabling them to adjust factual details or refine descriptions to match what they observed during the event. This step 260 ensures that any errors introduced by automated processes—such as misidentifying objects or incorrectly interpreting events—are corrected before the report is finalized.

At step 270, the report 180 is submitted to the report database 190. This may occur by returning the report to the server 120, which is then responsible for submitting the report 180 appropriately. The return of the edited report 180 to the server 120 also allows the assessment component 175 to compare the report 180 generated by component 170 with the final edited version. This will allow the assessment component 175 to better assess the capabilities of the various components of the server 120, while also tracking the types of edits regularly made by users. Method 200 then terminates at step 280.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for generating a report from a video, the method comprising:
  a) receiving, at a server, the video comprising audio data and multiple frames of image data;
  b) extracting, by the server, individual frames from the video;
  c) performing, by an object detection generative AI component, object detection on the individual frames to identify identified objects within the individual frames;
  d) tracking, by an object tracking generative AI component, the identified objects across the individual frames to maintain object continuity to identify tracked objects;
  e) analyzing, by a Long Short-Term Memory (LSTM) generative AI component, the tracked objects, the audio data, identified feature points, and geolocation-enhanced data to generate a contextual timeline of events; and
  f) detecting, by an event detection generative AI component, events within the contextual timeline generated by the LSTM generative AI component;

g) analyzing, by a scene understanding generative AI component, the detected events to generate a contextual understanding of the scene;

h) generating, based on the contextual timeline, the detected events, the contextual understanding, and a report template, a formatted report using a report generation generative AI component.

2. The method of claim 1, further comprising analyzing, by an audio analysis component, the audio data to create analyzed audio data, and submitting the analyzed audio data as input to the LSTM generative AI component.

3. The method of claim 2, wherein the analyzed audio data is textual, and includes an audio transcript of spoken words.

4. The method of claim 3, wherein the analyzed audio data includes descriptions of non-spoken sounds.

5. The method of claim 1, wherein step f) further comprises:
  i) generating, by a description generation generative AI component, a written description of the events based on the contextual timeline of events; and
  ii) applying, by the report generation generative AI component, the report template to the written description to produce the formatted report.

6. The method of claim 1, further comprising:
  i) aggregating, by the server, metadata for the tracked objects identified across the individual frames to create a dataset of each object's behavior over time; and
  ii) assigning, by an object importance generative AI component, importance weights to the tracked objects based on the aggregated metadata, and
  iii) submitting the importance weights to the LSTM generative AI component for use in generating the contextual timeline of events.

7. The method of claim 1, further comprising: identifying, by a feature point identification component, the identified feature points within the individual frames.

8. The method of claim 1, further comprising: applying, by a geomapping component, geolocation data associated with the video to the tracked objects to generate the geolocation-enhanced data to enhance location information in the contextual timeline of events.

9. A method for generating a report from a video, the method comprising:
  a) receiving, at a server, the video comprising audio data and multiple frames of image data;
  b) extracting, by the server, individual frames from the video;
  c) performing, by an object detection generative AI component, object detection on the individual frames to identify identified objects within the individual frames;
  d) tracking, by an object tracking generative AI component, the identified objects across the individual frames to maintain object continuity to identify tracked objects;
  e) analyzing, by an audio analysis component, the audio data to create analyzed audio data;
  f) identifying, by a feature point identification component, feature points within the individual frames;
  g) applying, by a geomapping component, geolocation data associated with the video to the tracked objects to generate geolocation-enhanced data;
  h) analyzing, by an LSTM generative AI component, the tracked objects, the analyzed audio data, the identified feature points, and the geolocation-enhanced data to generate a contextual timeline of events;
  i) detecting, by an event detection generative AI component, events within the contextual timeline generated by the LSTM generative AI component;
  j) analyzing, by a scene understanding generative AI component, the detected events to generate a contextual understanding of the scene;
  k) generating, based on the contextual timeline, the detected events, the contextual understanding, and a report template, a formatted report using a report generation generative AI component.

10. The method of claim 9, wherein step k) further comprises:
  i) generating, by a description generation generative AI component, a written description of the events; and
  ii) applying, by the report generation generative AI component, the report template to the written description to produce the formatted report.

11. A computing device comprising:
  a) a processor configured to execute computer programming;
  b) a memory containing the computer programming, the computer programming configured to instruct the processor to:
    i) receive a video comprising audio data and multiple frames of image data;
    ii) extract individual frames from the video;
    iii) perform, by an object detection generative AI component, object detection on the individual frames to identify identified objects within the individual frames;
    iv) track, by an object tracking generative AI component, the identified objects across the individual frames to maintain object continuity to identify tracked objects;
    v) analyze, by a Long Short-Term Memory (LSTM) generative AI component, the tracked objects, the audio data, identified feature points, and geolocation-enhanced data to generate a contextual timeline of events; and
    vi) detecting, by an event detection generative AI component, events within the contextual timeline generated by the LSTM generative AI component;
    vii) analyzing, by a scene understanding generative AI component, the detected events to generate a contextual understanding of the scene;
    viii) generate, based on the contextual timeline, the detected events, the contextual understanding, and a report template, a formatted report using a report generation generative AI component.

12. The computing device of claim 11, wherein the computer programming further instructs the processor to analyze, by an audio analysis component, the audio data to create analyzed audio data, and submit the analyzed audio data as input to the LSTM generative AI component.

13. The computing device of claim 11, wherein the computer programming further instructs the processor to generate the formatted report by:
  i) generating, by a description generation generative AI component, a written description of the events based on the contextual timeline of events; and
  ii) applying, by the report generation generative AI component, the report template to the written description to produce the formatted report.

14. The computing device of claim 11, wherein the computer programming further instructs the processor to:

i) aggregate metadata for the tracked objects identified across the individual frames to create a dataset of each object's behavior over time; and
ii) assign, by an object importance generative AI component, importance weights to the tracked objects based on the aggregated metadata, and
iii) submit the importance weights to the LSTM generative AI component for use in generating the contextual timeline of events.

15. The computing device of claim 11, wherein the computer programming further instructs the processor to identify, by a feature point identification component, the identified feature points within the individual frames.

16. The computing device of claim 15, wherein the computer programming further instructs the processor to apply, by a geomapping component, geolocation data associated with the video to the tracked objects to generate the geolocation-enhanced data to enhance location information in the contextual timeline of events.

* * * * *